US006523874B1

(12) United States Patent
Edmeyer et al.

(10) Patent No.: US 6,523,874 B1
(45) Date of Patent: Feb. 25, 2003

(54) PACKAGING APPARATUS AND METHOD

(75) Inventors: David Edmeyer, Mendota Heights, MN (US); Michael Anderson, Marine On St. Croix, MN (US); Robert Theilbar, St. Paul Park, MN (US)

(73) Assignee: Edmeyer, Inc., West St. Paul, MN (US)

( * ) Notice: Subject to any disclaimer, the term of this patent is extended or adjusted under 35 U.S.C. 154(b) by 0 days.

(21) Appl. No.: 09/685,757

(22) Filed: Oct. 9, 2000

(51) Int. Cl.⁷ .................................................. B66C 1/42
(52) U.S. Cl. ......................... 294/87.2; 294/100; 53/247
(58) Field of Search .............................. 294/87.1, 87.2, 294/99.1, 100, 116, 90; 414/626, 736; 53/247

(56) References Cited

U.S. PATENT DOCUMENTS

| 2,524,880 A | | 10/1950 | Cattonar et al. ................ 214/1 |
| 2,568,210 A | * | 9/1951 | Whitney ...................... 294/100 |
| 2,802,691 A | * | 8/1957 | Barr ........................... 294/100 |
| 2,863,579 A | | 12/1958 | Meyer ......................... 214/309 |
| 2,899,232 A | * | 8/1959 | Walter, Jr. .................. 294/116 |
| 2,918,325 A | | 12/1959 | Gibson ......................... 294/87 |
| 2,999,604 A | | 9/1961 | Chalich ......................... 214/1 |
| 3,086,805 A | * | 4/1963 | Dardaine et al. ............ 294/100 |
| 3,505,787 A | | 4/1970 | Tiews .......................... 53/166 |
| 3,554,594 A | * | 1/1971 | Thoma ........................ 294/100 |
| 3,648,427 A | | 3/1972 | Raudat et al. .................. 53/61 |
| 3,780,492 A | * | 12/1973 | Corderoy .................... 294/87.1 |
| 3,843,316 A | | 10/1974 | Amberg et al. ............. 432/124 |
| 3,885,825 A | | 5/1975 | Amberg et al. ............... 294/15 |
| 4,055,943 A | | 11/1977 | Reichert ....................... 53/247 |
| 4,257,639 A | * | 3/1981 | Stock .......................... 294/100 |
| 4,259,826 A | | 4/1981 | Campbell ...................... 53/543 |
| 4,625,854 A | | 12/1986 | Deichmann et al. ......... 198/416 |
| 5,029,925 A | * | 7/1991 | Rietzler ....................... 294/100 |
| 5,242,256 A | * | 9/1993 | Appel ......................... 294/100 |
| 5,295,723 A | * | 3/1994 | Kronseder ................... 294/100 |
| 5,797,249 A | | 8/1998 | Hartness ....................... 53/473 |
| 5,851,042 A | | 12/1998 | Bankuty et al. ............. 294/106 |

FOREIGN PATENT DOCUMENTS

GB          1200141       *   7/1970    ................ 294/100

* cited by examiner

Primary Examiner—Dean J. Kramer
(74) Attorney, Agent, or Firm—Kurt J. Niederluecke; Briggs and Morgan, P.A.

(57) ABSTRACT

The present invention provides a packaging apparatus for gripping, lifting, and then moving a plurality of individual products from a first location to a second location. The apparatus includes first and second plates and a plurality of individual grippers that are each selectively actuated to grip a single product and to release the product at a preselected time. Each gripper includes a plurality of slots extending upwardly from the base of each gripper, thereby providing a plurality of gripper fingers. Each gripper extends through an appropriately configured hole in the second plate into a fixed engagement with the first plate. The second plate is movably mounted to the first plate such that it can be moved relatively thereto. The holes in the second plate are sized to engage the gripper fingers when moved apart from the first plate. As the plates continue to move apart, the continuing camming engagement between the second plate and the gripper will cause the gripper fingers to be moved inwardly into a gripping engagement with the products.

15 Claims, 6 Drawing Sheets

PACKAGING APPARATUS AND METHOD

FIELD OF THE INVENTION

The present invention relates generally to the packaging industry and specifically to apparatus useful for placing containers within their shipping packaging.

BACKGROUND OF THE PRESENT INVENTION

The product packaging industry has been prolific in the invention of new and useful devices for packaging the wide variety of products produced in varying sizes, shapes, and weights. Broadly speaking, one such industry where automated product packaging equipment is used is in the wide variety of businesses that sell fluid products in containers typically no larger than a gallon in size. Examples of such products are beverages, including but not limited to soft drinks and milk, automotive products, such as antifreeze, oil, and windshield cleaner, and cleaners, such as bleach, ammonia, and other well known examples.

The common thread of these businesses is the use of a container, typically plastic but occasionally glass, to hold a fluid. Such containers take many forms, but generally have a body portion which holds the fluid, a neck and a cap. The body portions are generally cylindrical (as with many soft drink containers), square (as with one-gallon milk containers), or rectangular (as with several forms of antifreeze containers and fruit juice containers), though other regular configurations could also be used.

A review of the prior art shows that many and varied types of packaging machines and related equipment have been invented to package the containers. These typically involve quite complicated and quite expensive gearing and camming apparatus used to grasp one or more of the containers, move them to a pre-determined location, and then place them within the appropriate package for transport. Repairs on such machines are often time consuming, resulting in the shut down of production lines. It would be desirable to have packaging apparatus that was simpler in operation and that did not need the complicated machinery of prior art devices, thereby reducing costs and improving efficiency in the packaging operation.

SUMMARY OF THE INVENTION

It is an object of the present invention to provide new and improved apparatus that is not subject to the foregoing disadvantages.

It is another object of the present invention to provide an improved packaging machine useful for packing fluid containers into a transport carton.

It is still another object of the present invention to provide an improved packaging machine that utilizes a plurality of grippers each having a plurality of fingers, with each gripper being substantially simultaneously activated to grip the rim of a container.

It is yet another object of the present invention to provide a gripper having a unitary structure that enables easy and rapid replacement when needed.

The foregoing objects of the present invention are provided by a packaging apparatus for gripping, lifting, and then moving a plurality of individual products from a first location to a second location. The apparatus includes first and second substantially parallel plates and a plurality of individual grippers that are collectively, selectively actuated to grip a single product and to release the product at a preselected time. Each gripper includes an attachment portion and a camming and gripping portion having a configuration substantially akin to a conic section. A plurality of relief slots extend upwardly from the base of each gripper, thereby providing a plurality of gripper fingers. Each gripper extends through an appropriately configured hole in the second plate into a fixed engagement with the first plate. The second plate is movably mounted to the first plate such that it can be moved relatively thereto while maintaining the substantial parallel relationship of the two plates. The holes in the second plate are sized to receive comfortably the attachment portion of each gripper but are also sized to engage the conic section portion thereof when moved apart from the first plate. As the plates continue to move apart, the continuing camming engagement between the second plate and the gripper will cause the gripper fingers to be moved inwardly into a gripping engagement with the products.

The foregoing objects of the invention will become apparent to those skilled in the art when the following detailed description of the invention is read in conjunction with the accompanying drawings and claims. Throughout the drawings, like numerals refer to similar or identical parts.

DETAILED DESCRIPTION OF THE INVENTION

Figure 1:
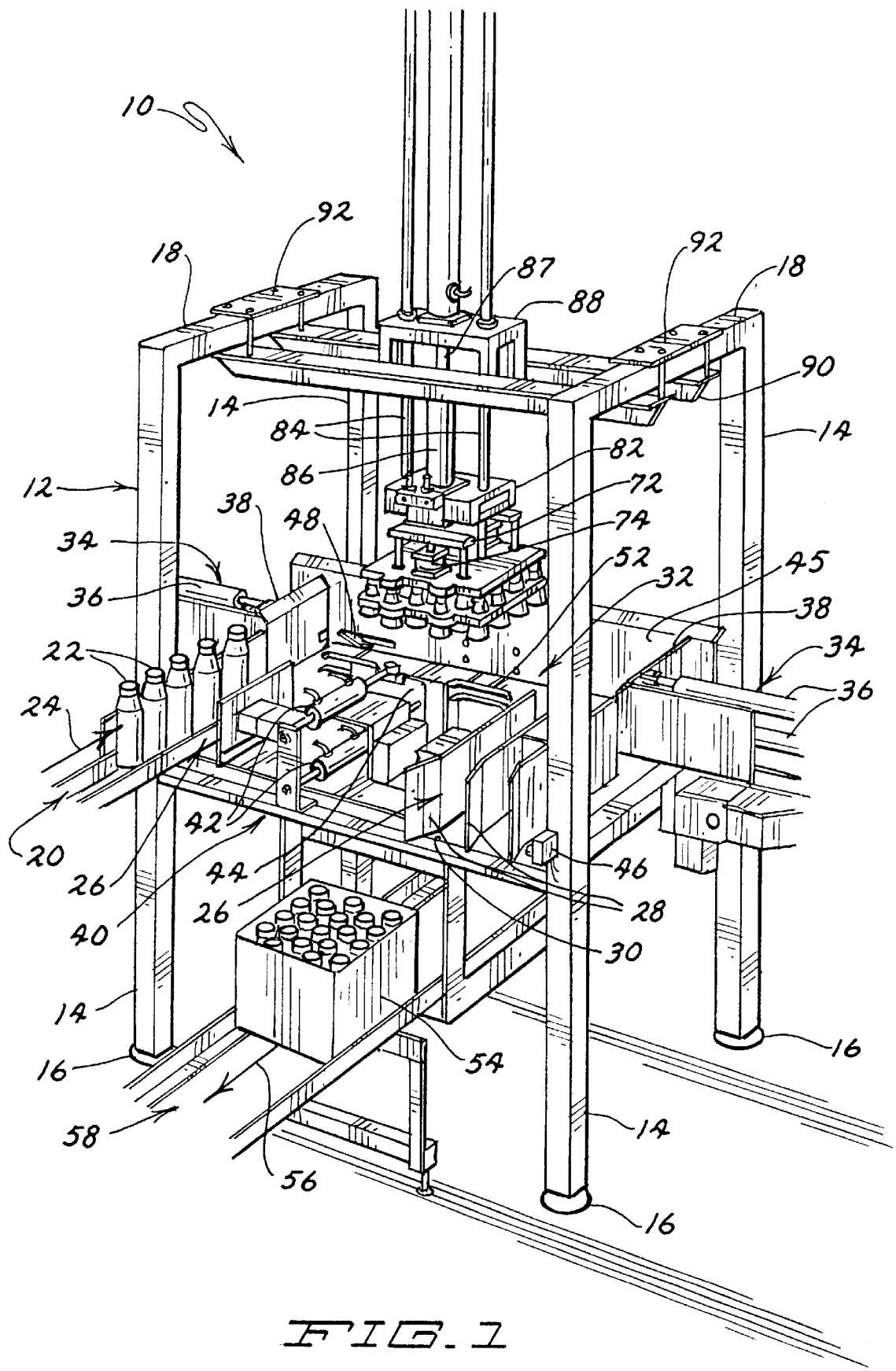
FIG. 1 is a perspective view of a packaging machine or apparatus in accord with the present invention.
Figure 2:
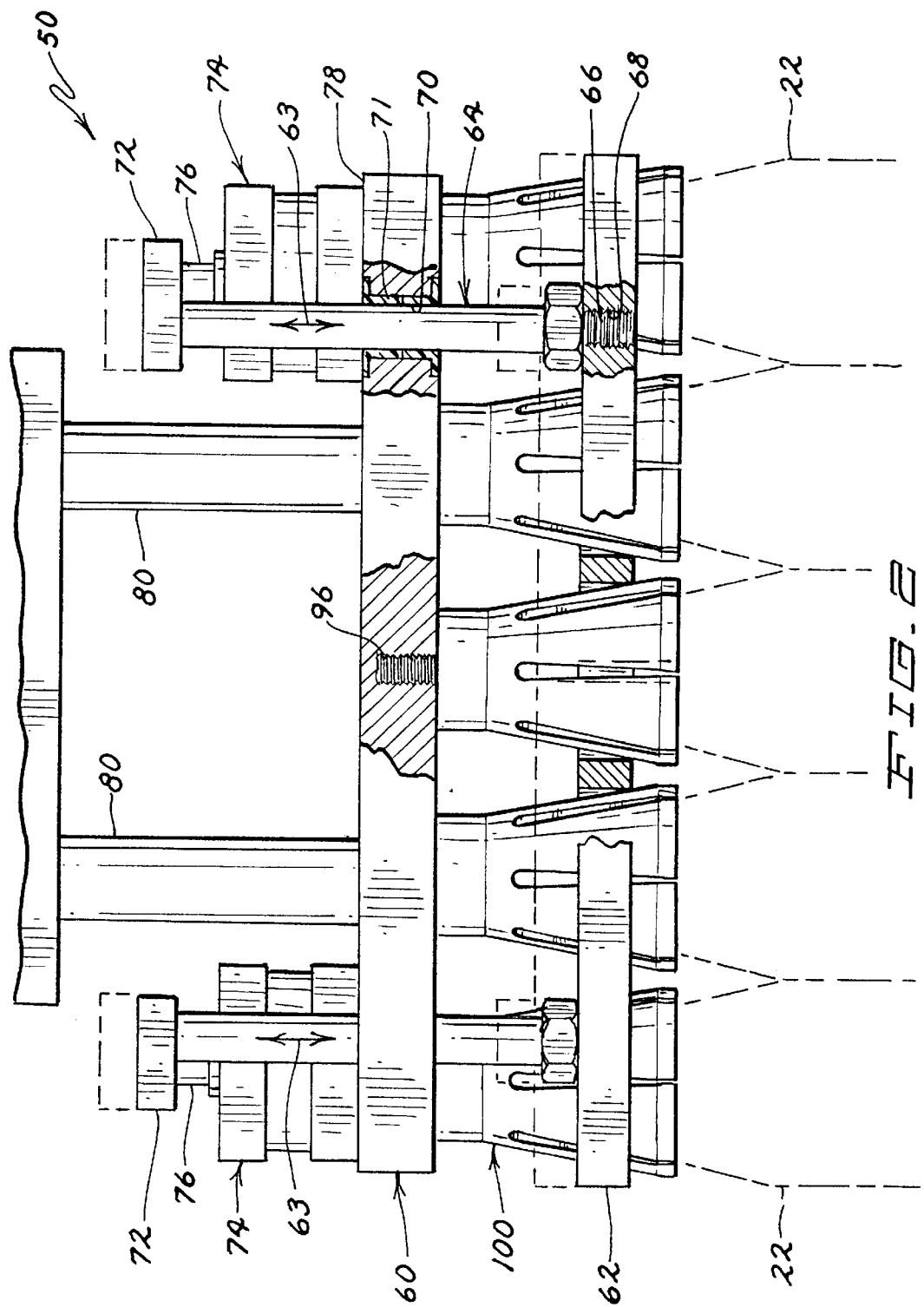
FIG. 2 shows a gripper apparatus in accord with the present invention is a side elevation, partial perspective view.

A packaging machine 10 in accord with the present invention is shown in FIG. 1. It will be understood that such a machine could take numerous forms in accord with the invention and that the embodiment shown herein is one such form. It will be seen that the packing machine 10 includes a frame 12 comprising a plurality of legs or supports 14 with the appropriately configured levelers 16 attached thereto for leveling the packaging machine 10. Frame 12 further includes a pair of overhead, substantially horizontally extending supports 18, each support 18 extending between a pair of legs 14. Supports 18 and legs 14 can be made of any appropriate material, such as steel.

The frame 12 provides support for the various apparatus used to convey, position, pick up, and place one or more bottles into a package, and then convey the package away from the packaging machine 10. Thus, a pair of appropriately sized feed conveyors 20, one of which is partially shown and the other which is not shown, is used to feed containers 22 into the packaging machine 10 as indicated by arrow 24. Because of the multitude of ways of feeding such containers into a packaging machine presently known in the art, it will be understood that the containers 22 could be brought to the packaging machine 10 in any such known manner consistent with the operation of the present invention.

A packaging machine 10 in accord with the present invention may include one or more devices or apparatus to properly position the containers 22 for pickup and placement. Thus, the packaging machine 10 shown in the Figure may include one or more movable pistons for moving and positioning the containers 22. As shown, the containers 22 are fed into the packaging machine 10 into a pair of feed channels 26 disposed on opposing sides of the machine 10. The channels 26 may be formed in any known way and may be formed of any known material. In one embodiment of the present invention and as shown in the Figure the channels 26 include a pair of side walls 28 and a channel bed 30, all of which may be formed from stainless steel, by way of example only. The conveyors 20 feed the containers 22 into a positioning and pickup area generally indicated at 32.

Once in the positioning and pickup area 32, the containers 22 will be moved by one or more pistons or plungers into the proper position for pickup and placement into a container, box, or other transportation carton. As shown in the Figure, the packaging machine 10 includes a pair of side plungers 34 activated in any known manner such as by one or more air, hydraulic, and/or electrical cylinders 36, the hose connections being omitted for purposes of clarity. Side plungers 34 will engage the containers 22 with a push plate 38 after the containers have been fed into the area 32 and will be pushed toward the center of the area 32. Depending upon the configuration of the containers 22, such as where they are substantially cylindrical in configuration as shown in the Figure, another plunger may be required to create a staggered arrangement of containers for packing efficiency. It will be understood that where such a staggered arrangement is not required, then the additional plunger may not be necessary. As shown in the Figure, however, the packaging machine 10 includes a third position plunger 40 including a push plate 44, which is also activated by one or more air, hydraulic, and/or electrical cylinders 42. When activated, the cylinders 44 will cause the push plate 42 to engage the containers 22 and properly position them for pickup. The push plate 42 can be configured as desired to accommodate the configuration of the containers 22 and the need to position them for packing efficiency.

In operation, the conveyors 20 will feed containers 22 into the packaging machine 10 and, with the plungers 34 and 40 in the withdrawn position as shown in FIG. 1, against the back stop plate 45. The side plungers will be activated and each will push a row of containers toward the center of the machine 10 and the pickup area 32. This will continue until the proper number of containers have been brought into the machine for packaging. At that time the plungers 34 and 40 will be activated to push the containers into the final position for pickup. It will be understood that such sequences of actions are well known in the art and that they will vary depending upon the configuration and number of containers to be packaged.

Sensors, such as an infrared sensor 46, may be used to count or otherwise sense the containers as they pass. Additional sensors such as a knife blade sensor 48 may also be used to trigger the operation of the conveyors 20 and the plungers 34 and 40. It will be understood that the operation of all of the various component parts of the packaging machine 10 can be controlled by an appropriated programmed microprocessor or other computing device, which is not shown for purposes of clarity. Representative examples of such machines and the foregoing equipment are sold by the assignee of the present invention.

Once the containers 22 have been properly positioned to be picked up for packaging, the containers will be picked as a group using the gripper apparatus 50. Gripper apparatus 50 is movable in a vertical direction and will be lowered into a picking position relative to the pre-positioned containers 22. The gripper apparatus 50 will then grasp the containers and a pair of doors 52 disposed beneath the containers 22 will open. The gripper apparatus 50 will be lowered such that the containers as group are placed within the appropriately configured package 54. The filled package 54 can then be conveyed away from the packaging machine 10 as indicated by arrow 56 using a conveyor 58.

The principal components of the packaging machine 10 having been set forth, the gripper apparatus 50 will be described in further detail with reference to FIGS. 2–6 principally. Gripper apparatus 50 will be seen to comprise a pair of substantially planar, substantially parallel, spaced apart plates 60 and 62. Plates 60 and 62 are movable relative to each other as indicated by double headed arrow 63. Thus, the lower plate 62 is mounted to a plurality of lift rods 64, each of which includes a threaded end 66 that is received by a threaded hole 68 in the lower plate 62. The lift rods 64 each extend through a through hole 70 and a bearing 71 in the plate 60 and into engagement with a lift bar 72, which as seen in FIG. 1 engages a pair of lift rods 64. The lift bars 72 are mounted to a means 74 for producing reciprocal vertical movement, which may be an air cylinder or a linear actuator or similar type of device, the economies of preparing and filing an application preventing the illustration of all such known, equivalent devices. Such devices 74 will typically include a plunger 76 that is attached to the lift bar 72. Devices 74 in turn are mounted to the upper surface 78 of the lower plate 62 by any known means, including bolting, welding, or the like. Thus, actuation of the devices 74 will cause the shaft 76 thereof to either extend or retract as the case may be, carrying along therewith the lift bars 72 and lift rods 64, and thereby raising or lowering the lower plate 62 relative to the upper plate 60, respectively.

The upper plate 60 is attached to a plurality of spacer bars 80, which in turn extend into a fixed engagement with a gripper apparatus lift plate 82. The plate 82 in turn is attached to a pair of guide rods 84 and a hollow tube 86 within which an air, hydraulic, and/or electrical cylinder 87 is disposed. That is, one end of the guide rods 84 engage the plate 82 and they extend upwardly therefrom through the appropriately configured through holes in a support frame 88. The cylinder 87 is attached to the support frame 88. The support frame 88 is in turn attached to a plurality of support rails 90 that are attached to the overhead support bars 18 by yokes 92.

The first plate 60 may include a plurality of holes 94 capable of receiving the shaft 96 of a bolt 98. Bolt 98 may be used to attach a gripper 100 to the first plate. Each gripper 100, best seen in FIGS. 3–5, extends through an appropriately sized and configured aperture 102 in the second plate 62.

Figure 8:
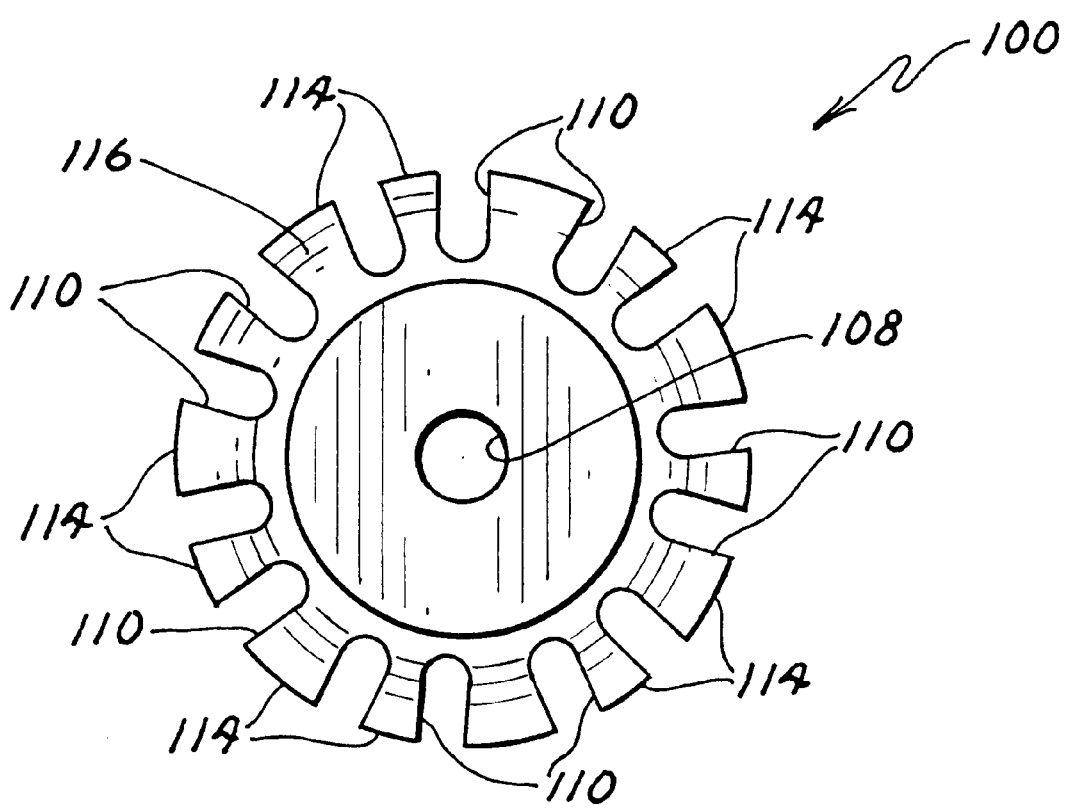
FIG. 8 illustrates in a top plan view an alternative embodiment of a gripper in accord with the present invention wherein the gripper slots are spaced varying distances apart.

Gripper 100, as shown in the embodiment in the Figures, is a unitary structure and has a substantially cylindrical attachment portion 104 and a substantially conic exterior camming portion 106. The attachment portion 104 includes a substantially centrally disposed through hole 108 configured to receive the bolt 98. The camming portion 106 includes a plurality of slots 110 that extend from the bottom edge 112 of the gripper 100 upwardly toward the attachment portion 104. The slots 110 create a plurality of inwardly and outwardly flexing fingers 114. In the embodiment shown, the slots 110 are regularly spaced about the gripper 100 thereby creating a plurality of equally sized fingers. It will be understood, however, by those skilled in the art that the slots need not be regularly spaced about the gripper 100. That is, the slots 110 could be placed at any desired interval or spacing desired, thereby creating fingers of unequal size, so long as the gripping function of the gripper was unimpaired. Thus, as seen in FIG. 8, which is a top plan view of an alternate embodiment of a gripper 100, the slots 110 are shown spaced at varying distances from each other.

Figure 3:
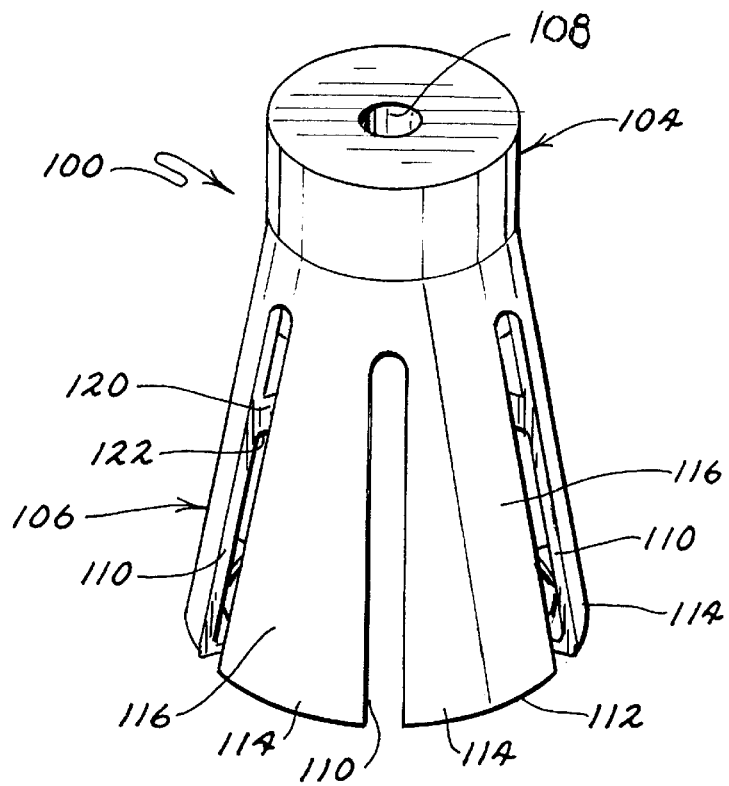
FIG. 3 illustrates an embodiment of a gripper in accord with the present invention in a perspective view.
Figure 4:
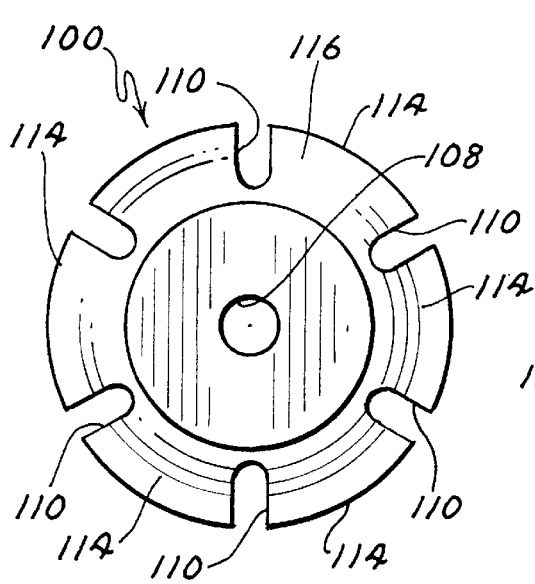
FIG. 4 depicts the gripper illustrated in FIG. 3 in a top plan view.
Figure 5:
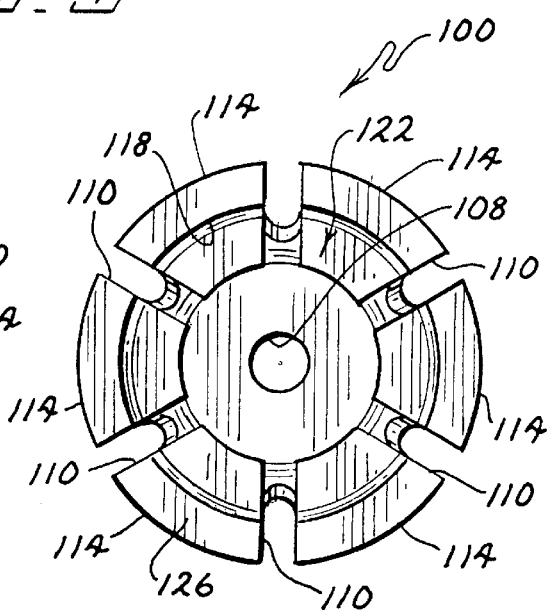
FIG. 5 shows the gripper illustrated in FIG. 3 in a bottom plan view.

Because the fingers can be flexed inwardly, the exertion of a pressure on the outer surface 116 of the camming portion 106 will cause the fingers 114 to move inwardly; a release of that pressure then will allow the natural elastic bias of the material forming the fingers 114 to return to the fingers their rest or undeformed state as seen in FIG. 3.

The camming portion 106 includes an interior surface 118 and a circumferentially extending, inwardly extending interference/stop lip 120 having a container lid engaging surface 122. The stop lip 120 is disposed below the upper end 124 of the slots 110.

Figure 6A:
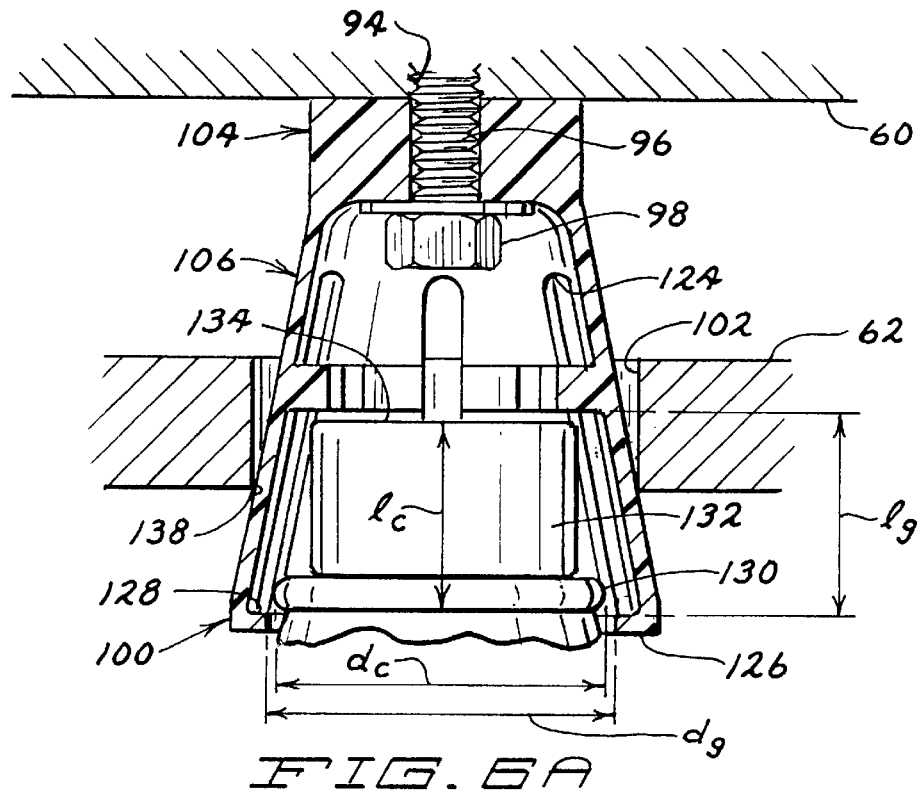
FIG. 6A shows a portion of the packaging sequence in accord with the present invention wherein a gripper has been lowered into a gripping position relative to a container.
Figure 6B:
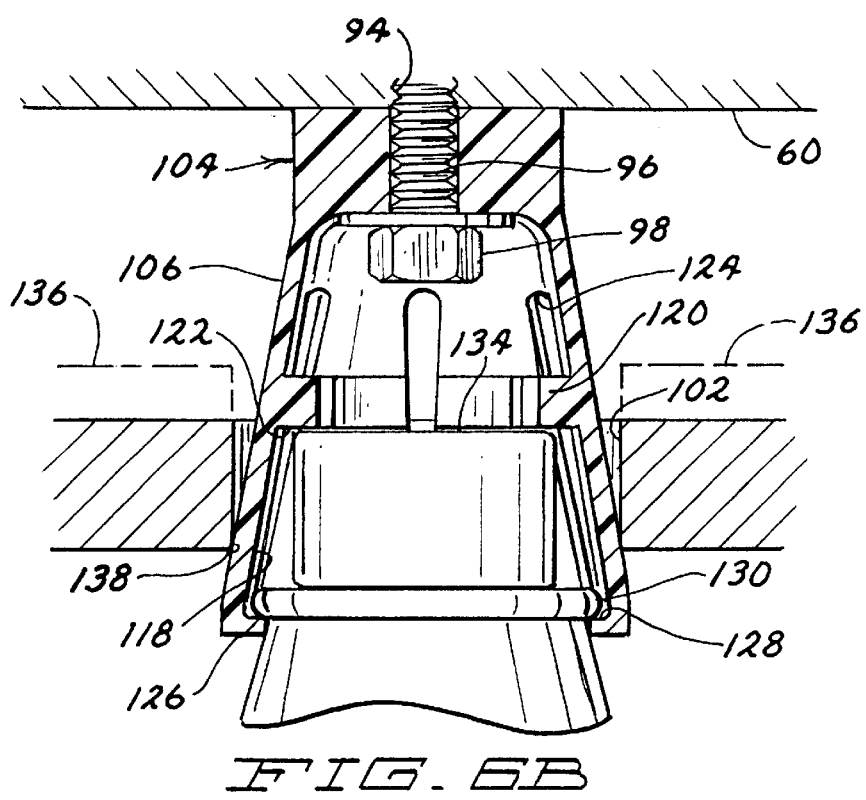
FIG. 6B shows a continuation of the packaging sequence wherein the gripping plate has been lowered relative to the gripper causing it to grip the container.
Figure 7A:
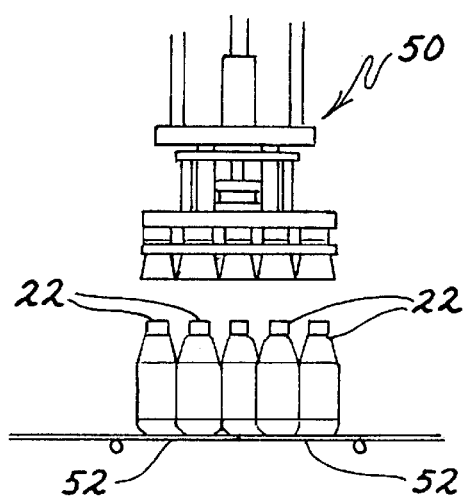
FIGS. 7A, 7B, 7C and 7D illustrate a packaging sequence in accord with the present invention.
Figure 7B:
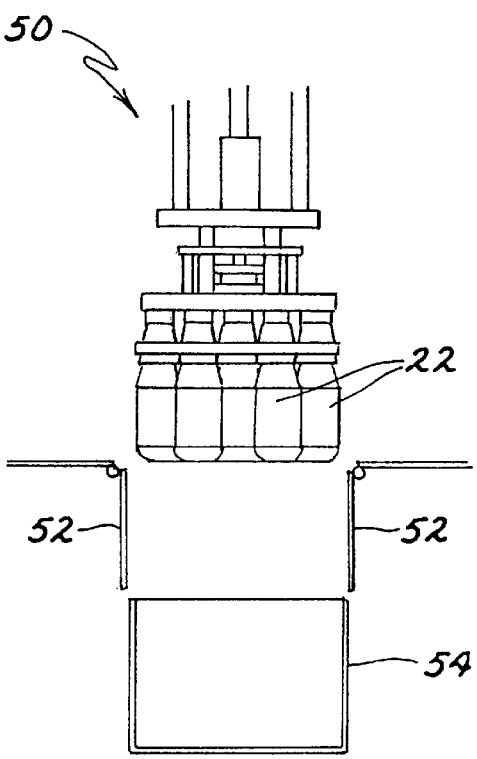
Figure 7C:
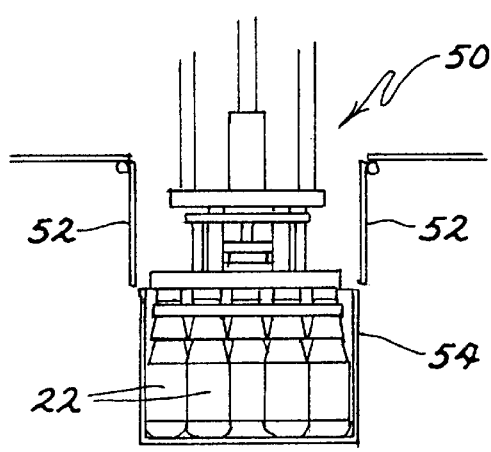
Figure 7D:
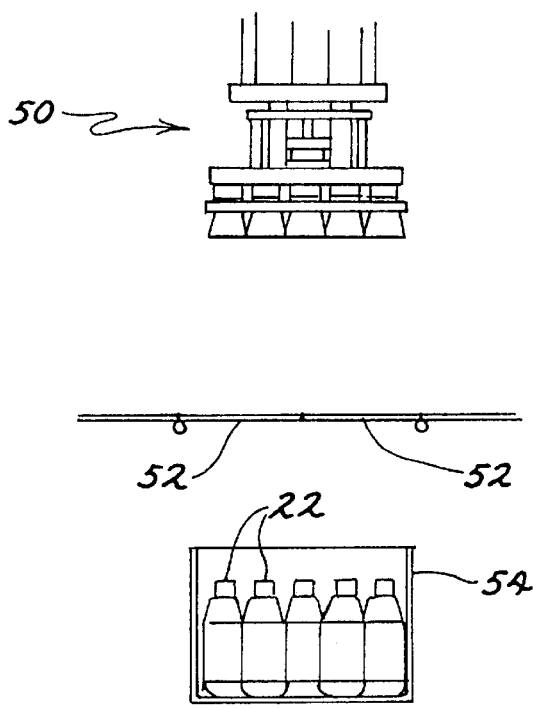

As best seen in FIGS. 6A and 6B, the gripper 100 also includes a gripper lip 126 formed by an inwardly extending lip at the bottom thereof. The gripper lip includes an upper surface 128 and has an inner diameter $d_g$. The gripper 100 is, as best seen in FIGS. 6A and 6B, used to grip a container 22. It will be observed that the container 22 includes a circumferentially extending, outwardly extending rim 130 having a diameter $d_c$, less than gripper lip 124 diameter $d_g$, that is, $$d_c < d_g.$$

That is, for a particular container having such a rim 130, the diameter $d_g$ of the gripper lip will be larger than the diameter $d_c$ of such a rim 130.

In operation, as best seen in FIGS. 6A–7D, when a plurality of containers 22 is properly positioned for pickup and placement in a carton 54, the gripper apparatus 50 will be lowered through the operation of the cylinder 87 until the gripper lip 126 is disposed below the rim 130. To prevent the gripper apparatus 50 from being lowered too far, the caps or lids 132 will engage the surface 122 of the interference/stop lip 120. It will be seen that the upper surface 128 and the interference/stop surface 122 define a distance $l_g$ and that the upper surfaces 134 of the lids and the bottom of the rims 130 define a distance $l_c$, wherein $$l_c < l_g.$$

Once positioned over the containers as seen in FIG. 6A, the lower plate 62 will be lowered from its rest position 136 shown in FIG. 6A and in phantom in FIG. 6B relative to the upper plate 60 through the retraction of the plunger 76 of the air, hydraulic, and/or electrical cylinders 74. This lowering of the plate 60 will cause the inner edge 138 of the through hole 102 in plate 62 to engage the camming surface 116 of the gripper 100, forcing the fingers 114 inwardly. As the fingers 114 are forced inwardly, the upper surface 128 will engage the underside of the rim 130 as best seen in FIG. 6B.

Having grasped the containers 22 with the grippers 100, the doors 52 will be opened (FIG. 7B) and the entire gripper apparatus 50 will be lowered so as to place the containers 22 within the carton 54 (FIG. 7C) through the use of the cylinder 87. Once the containers have been placed within the carton, the lower plate 62 will be raised relative to the upper plate 60, thus allowing the fingers 114 to return to their rest position shown in FIG. 6A and thus releasing the grip on the containers. The gripper apparatus 50 will then be withdrawn, the full carton will be conveyed away, and the doors 52 will be closed so as to enable a new set of containers to be positioned for placement within the next carton.

Gripper 100 may be made of a synthetic material. An example of such a material is Nylatron®, a material manufactured by DSM Engineering Plastics. Other materials such as a spring steel or a hard rubber may also suffice to form the gripper 100.

The present invention having thus been described, other modifications, alterations, or substitutions may now suggest themselves to those skilled in the art, all of which are within the spirit and scope of the present invention. For example, the containers shown in the Figures are substantially cylindrical in configuration and include around neck with the round gripping lip. Consequently, the grippers are configured to conform to that round gripping lip. Obviously, the containers could have any other configuration, such as a substantially square configuration with the circular neck as is commonly found on plastic milk bottles or a rectangular configuration with a round neck as is found on other liquid containers, such as antifreeze or fruit juice. In addition, the container neck itself need not be round. That is, the container neck could have other configurations, such as square, pentagonal, hexagonal, septagonal, octagonal, or other multi-sided configuration and the gripper would likewise have a gripper lip having a conforming configuration with a plurality of fingers equal to the number of sides of the rim of the container. It will be understood, however, that as the number of sides on the container rim increases the rim more closely approaches an overall circular configuration and the gripper 100 would find use with such a rim while maintaining the overall configuration as shown in the drawings.

In addition, the outer surface of the gripper 100 need not be circular in cross-section, but could adopt any other configuration with the inner edge 138 of through hole 102 appropriately configured. That is, it will be understood that, broadly speaking, the outer surface of the gripper 100 provides a symmetric cross-section. As shown, that cross-section would be circular. Nevertheless, the outer surface of gripper 100 could have other configurations, such as square, pentagonal, hexagonal, or greater. Such configurations are within the scope of the present invention, as are irregular, non-symmetric configurations. If the gripper 100 is so configured, the camming plate 62 camming apertures 102 would be similarly configured. In addition, the gripper 100 could have a uniform configuration along its entire extent, such as all cylindrical or all square, etc.; that is, that the attachment portion and camming portion could have the same configuration.

Another modification within the scope of the present invention is that the plates 60 and 62 need not have substantially planar upper and lower surfaces as shown. Any configuration that would allow uniform and substantially simultaneous application of pressure to the fingers 114 of the grippers 100 is within the scope of the present invention.

Finally, the present invention as shown includes a gripper 100 having six fingers 114 useful in gripping a round container rim. More or less fingers could be provided by additional or fewer slots 110 and such a gripper 100 would be within the scope of the present invention.

The foregoing and other modifications to the present invention will readily suggest themselves to those skilled in the art Therefore, it is intended that the present invention be limited only by the scope of the attached claims below.

What is claimed is:

1. Product container gripping apparatus for gripping a plurality of product containers substantially simultaneously, each product container including a rim, said apparatus comprising:

first and second substantially planar plates movable relative to each other, said second plate including a plurality of camming apertures extending therethrough, each said plurality of camming apertures each including at least one camming aperture surface;

a plurality of grippers, each said gripper extending through said camming aperture and being attached to said first plate, said each of said plurality of grippers including a plurality of outwardly biased, inwardly movable fingers, each said finger including a camming finger surface for engagement with said camming aperture engagement surface of a said camming aperture;

wherein movement of said second plate away from said first plate causes said camming aperture engagement surfaces to engage said camming finger surfaces of each said gripper and cause said fingers to move inwardly to grip the rim of a product container and thereby grip a plurality of product containers substantially simultaneously.

2. The apparatus of claim 1 wherein each said gripper is manufactured from a synthetic material.

3. The apparatus of claim 1 wherein each said gripper has a substantially conic configuration.

4. The apparatus of claim 1 and further including means for moving said first and second plates relative to each other.

5. The apparatus of claim 4 wherein said means for moving comprises at least one air, hydraulic, and/or electrical cylinder.

6. The apparatus of claim 1 wherein each said gripper comprises a unitary structure and has a bottom edge and said fingers are formed by a plurality of slots extending from said bottom edge.

7. The apparatus of claim 6 wherein said gripper slots are regularly spaced from each other.

8. The apparatus of claim 6 wherein each said gripper has a substantially hollow conic configuration and an inner surface and wherein said gripper bottom edge includes a gripper lip extending inwardly from said inner surface, said gripper lip engaging the rim of a product container.

9. The apparatus of claim 6 wherein each said gripper includes a stop lip extending inwardly from said inner surface, said stop lip being provided for limiting the extent to which the container can extend into said gripper.

10. The apparatus of claim 9 each said gripper has a substantially hollow conic configuration and an inner surface and wherein said gripper bottom edge includes a gripper lip extending inwardly from said inner surface, said gripper lip engaging the rim of a product container and wherein the distance between said stop lip and said gripper bottom edge is a distance $l_g$;

the container includes a lid having a top surface and the distance between the lid top surface and the rim is a distance $l_c$; and $l_c < l_g$.

11. A gripper for a product packaging apparatus, said gripper being used for selectively gripping a rim of a liquid product container, the product container having a lid with a top surface spaced from the rim, said gripper comprising a unitary structure manufactured from a synthetic material and including a plurality of outwardly biased, inwardly movable fingers, each said finger including a camming finger surface for engagement with a camming means of a product packaging apparatus, said engagement causing said fingers to be moved inwardly, wherein said gripper has a substantially conic configuration;

wherein:

said gripper has a substantially hollow conic configuration, an inner surface, and a gripper bottom edge;

said gripper includes a stop lip extending inwardly from said inner surface, said stop lip being provided for limiting the extent to which the container can extend into said gripper;

said gripper bottom edge includes a gripper lip extending inwardly from said inner surface, said gripper lip engaging the rim of a product container;

the distance between said stop lip and said gripper bottom edge is a distance $l_g$ and the distance between the lid top surface and the rim is a distance $l_c$; and wherein $l_c < l_g$.

12. The gripper of claim 11 wherein said fingers are formed by a plurality of slots extending upwardly from said bottom edge.

13. The gripper of claim 12 wherein said gripper slots are regularly spaced from each other.

14. A method for gripping a plurality of containers including a rim extending therearound and placing the containers in a carton, said method comprising:

lowering a gripping apparatus comprising a plurality of grippers having a lower edge and a gripping lip extending inwardly from the lower edge over said containers, each gripper including a plurality of fingers movable inwardly and outwardly in response to the application of pressure thereto and the release of pressure thereon, respectively;

applying pressure on the grippers with a single camming plate, wherein the fingers of the grippers are outwardly extending and each gripper is received within a camming aperture of the camming plate, each camming aperture including a camming surface, and wherein movement of the camming plate in the direction of the bottom edge of the fingers causes the camming surface of the camming aperture to engage the fingers and exert pressure thereon;

moving the gripping apparatus and the containers relative to a carton for placement therein;

placing the containers in the carton; and releasing the pressure on the fingers of each said gripper substantially simultaneously so as to allow the fingers to rebound to their rest configuration and release the containers.

15. The method of claim 14 and further including:

releasing pressure on the fingers by moving the camming plate away from the bottom edge of the grippers.

* * * * *